Sept. 29, 1964 K. R. LOHBAUER ETAL 3,150,685
HYDRAULIC CONTROL WITH MECHANICALLY VENTED
PUMP UNLOADING MEANS
Filed Feb. 21, 1963
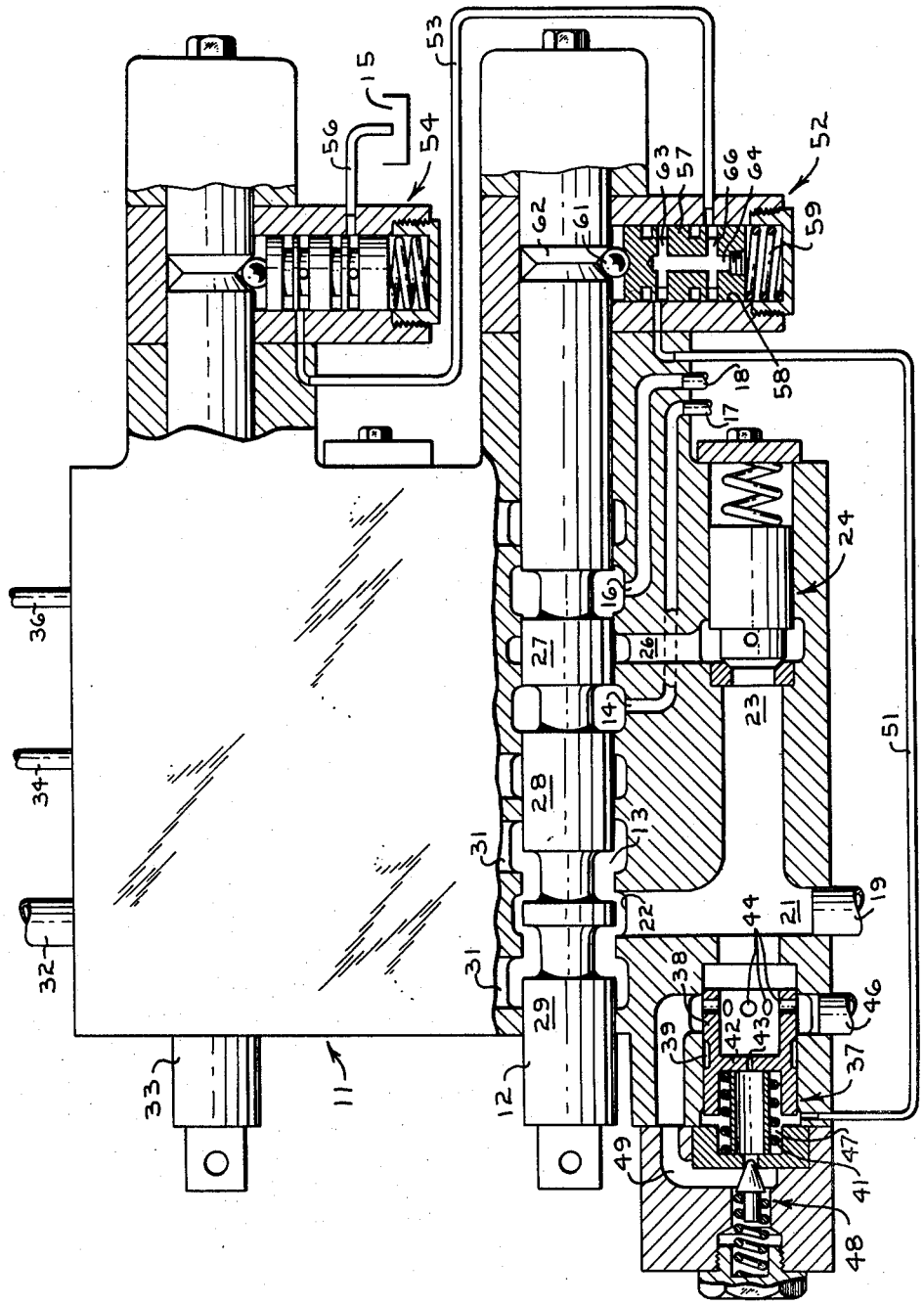
INVENTORS.
KENNETH R. LOHBAUER
BY JAMES E. SCHEIDT
Fryer and Zimwold
ATTORNEYS United States Patent Office 3,150,685
Patented Sept. 29, 1964

3,150,685
HYDRAULIC CONTROL WITH MECHANICALLY VENTED PUMP UNLOADING MEANS
Kenneth R. Lohbauer and James E. Scheidt, Joliet, Ill., assignors to Caterpillar Tractor Co., Peoria, Ill., a corporation of California
Filed Feb. 21, 1963, Ser. No. 260,124
4 Claims. (Cl. 137—596.13)

The present invention relates to hydraulic control systems and more particularly to a control in which a vent spool is mechanically actuated to empty a relieve valve hydrostatic chamber when main valve spools are in a neutral position and thus permit a portion of the pump volume to be bypassed to the source tank through the relief valve.

When a hydraulic system includes a plurality of fluid actuated devices (i.e. gear selecting clutches of brakes), which are selectively operated by pressure fluid supplied from a single source, it is common practice to employ one or more spool valves as selection means. These spool valves are designed to be longitudinally movable to several positions, each corresponding to a different one of the fluid operated devices being actuated. When the spools are shifted from one position to another position, a different fluid path is established within the valve and the working fluid thereby directed to a different one of the devices to be operated. When none of the devices are to be operated (such as when a neutral condition is to be established) the fluid path set up within the valve is one which prevents the working fluid from reaching any of the fluid operated devices and directs the fluid to an output conduit which connects to the source from which the fluid originates.

A problem which often arises in systems of the type described above occurs when the valve is placed in its neutral condition and fluid is pumped through the valve directly back to the source. Under these conditions the rate of fluid flow is relatively high and the rather restrictive nature of the passages which the fluid must flow through causes heat to be generated within the working fluid. If this condition is allowed to prevail for any length of time enough heat can be generated to cause the working fluid to break down and thus be less effective when called upon to operate the fluid actuated devices. One way of preventing this excessive heat from being generated in the working fluid is to vent the hydrostatic chamber of a dump spool through ports controlled by the main valve spool to permit the pump volume to be bypassed. It has been found in practice, however, that when a vent spool is actuated to block the vent passage, the pressure in the hydrostatic chamber and the vent passage imposes a radial force on the main spool and causes it to stick in the actuated position.

Accordingly, it is an object of the present invention to provide bypass means for hydraulic fluid delivered to a spool valve when the valve is in a neutral position.

Another object of the present invention is to provide means to vent the relief valve hydrostatic chamber of a valve spool when the spool is in a neutral position without imposing radial forces of any substantial magnitude on the spool.

Further and more specific objects and advantages of the present invention are made apparent in the following specification wherein a preferred form of the invention is described by reference to the accompanying drawing:

The drawing is a partial side elevation of a valve having two spools and including a pressure relief valve for regulating the output pressure of the valve.

Referring now to the drawing, a control valve 11 includes a valve spool 12 which is slidably disposed in a valve bore 13. In communication with valve bore 13 are passages 14 and 16 which lead to conduits 17 and 18, respectively, which in turn lead to hydraulically operated mechanisms (not shown) such as clutches or brakes. Hydraulic fluid to operate the devices which communicate with conduits 17 and 18 is introduced to valve 11 through a conduit 19 which leads to an internal chamber 21. Chamber 21 communicates through a port 22 to valve bore 13 and through a port 23 to a check valve 24. When check valve 24 is urged to its open position communication exists between port 23 and a port 26 which leads to the bore 13.

The path which fluid follows after entering chamber 21 is dependent upon the position of spool 12. When spool 12 is in the neutral position, as illustrated, the port 26 is blocked by a land 27 on spool 12 such that all of the fluid is directed through port 22 to the portion of the bore 13 between lands 28 and 29. The fluid passes past the spool 12 through ports 31 toward a conduit 32 which leads the fluid back to the reservoir from which it originated. Thus, in this neutral position a constant flow of fluid passes through the valve and due to the relatively restrictive areas through which the fluid must pass, heat is generated in the fluid.

In order to illustrate that the invention is not limited to a control valve having a single spool, a second spool 33 is indicated as being hydraulically disposed between the conduit 32 and bore 13. Thus, when spool 12 is in its neutral position the fluid which passes through ports 31 may be directed by spool 33 to one of output conduits 34 or 36 (when the spool is in other than its neutral position) or it may be directed to conduit 32 leading back to the reservoir (when the spool 33 is in its neutral position). The manner in which positioning of spool 33 directs fluid to one or the other of conduits 34 or 36 is similar to the manner in which spool 12 operates to direct fluid to one or the other of conduits 17 or 18 such that the details of the spool 33 and its connecting passages have been eliminated to simplify the description of the invention.

If spool 12 is moved leftwardly from its neutral position, communication will cease to exist between port 22 and ports 31, and the fluid in chamber 21 will increase in pressure and open check valve 24 thus enabling fluid to pass through port 26, bore 13, passage 16 and conduit 18. Similarly, if spool 12 is moved rightwardly from its neutral position the fluid will be directed past the check valve 24 to port 26 which will then be in communication through bore 13 with passage 14 leading to conduit 17.

When one of conduits 17 or 18 (or 34 or 36) is charged with fluid from conduit 19, pressure will build up in chamber 21 as the fluid actuated device (not shown) is operated. In order to prevent an excessive build up of pressure, a relief valve, generally indicated at 37, is provided and communicates with chamber 21. Relief valve 37 includes a spool 38 which is slidable in a bore 39 and urged to a rightward position by a spring 41. The spool 38 is divided into two portions by a central wall member 42 having a restrictive orifice 43 therethrough. Under normal operating conditions spring 41 and fluid in the spring chamber 47 will urge spool 38 rightwardly such that a plurality of orifices 44 will be blocked from communication with a conduit 46 which leads to the reservoir 15 from which fluid is drawn and delivered to conduit 19. When orifices 44 are blocked from conduit 46 fluid enters spring chamber 47 and the pressure in chamber 21 exists on both sides of wall 42. Increases in pressure in chamber 21 above the desired maximum cause momentary pressure drops across orifice 43 due to the restrictive nature of orifice 43. These pressure differentials operate against spring 41 to urge spool 38 leftwardly and expose orifices 44 to conduit 46 to relieve the pressure in chamber 21. This is the normal operation of relief valve 37 and one which is well known in the art. If the pressure in chamber 21 exceeds the desired maximum for a sustained length of time (sufficiently long to enable the pressure to equalize on both sides of orifice 43) a check valve 48 which separates spring chamber 47 from conduit 46 via passage 49 will open to relieve the pressure from spring chamber 47 and allow spool 38 to move leftwardly whereby orifices 44 align with conduit 46 and reduce the pressure in chamber 21.

By means of the present invention, the hydrostatic chamber 47 is not only vented when the pressure in chamber 21 exceeds the desired maximum pressure over a substantial length of time, but also when the control valve 11 is conditioned to its neutral position and it is necessary to provide a bypass by which the pump fluid can reach the system reservoir. Accordingly, a conduit 51 communicates hydrostatic chamber 47 with a vent valve 52 which in turn is communicated through a conduit 53 with a second vent valve 54 which leads to the reservoir 15 through a conduit 56. Vent valve 52 includes a vent spool 57 generally perpendicular to spool 12 and slidably disposed in a valve bore 58 and urged to an upward position (as shown) by a spring 59. On the opposing end of spool 57 from spring 59 is a ball 61 which registers with a groove 62 circumscribed in spool 12 when the spool is in its neutral position. When the spool is not in the neutral position ball 61 registers with the outer periphery of the spool 12 and causes the spool 57 to be urged downwardly from the position which it assumes when the ball registers with the groove 62. In the neutral position (ball 61 registering with groove 62) conduit 51 communicates through a radial passage 63 with a longitudinal bore 64 in spool 57. Bore 64 also registers with a radial passage 66 which in turn communicates with conduit 53. Vent valve 54 is identical with valve 52 such that a communicating path is established between conduit 53 and conduit 56 when spool 33 is urged to its neutral position and the valve spool is urged upwardly. When the spool 12 is in other than the neutral position, and valve spool 57 thereby urged to a downward position, communication between the ports 63 and 66 and conduits 51 and 53, respectively, is effectively blocked such that fluid flow from one to the other is prevented. While the mechanism illustrated to position the vent valves is a detent, the invention is not limited thereto but is operable with other similar devices.

When the valve 11 is conditioned such that its spools are in their neutral position, a continuous path is formed between the chamber 47 and reservoir 15 through vent valves 52 and 54. This effectively evacuates the chamber 47 of pressure fluid such that the pressure drop across orifice 43 is sufficient to maintain the spool 38 in its leftwardly most position and thereby provide a bypass to the reservoir 15 for fluid entering through conduit 19 via orifices 44 and conduit 46. When either one of the spools is positioned to other than its neutral position, communication between chamber 47 and reservoir 15 through the vent valves will be discontinued such that pressure can build up in chamber 47 and thereby enable relief valve 37 to operate in its normal manner. As mentioned above, the present invention is not restricted to use with a single spool nor is it precluded from effectively operating in combination with a control valve which has only a single spool. When more than a single vent valve is employed (more than a single spool involved) the valves are hydraulically placed in series connection with one another such that the failure of any one of fthe valves to pass fluid, due to the fact that its corresponding spool is in other than the neutral position, will automatically prevent untimely venting of chamber 47.

The present invention thus provides an effective means for providing a bypass to the source reservoir when a control valve is in a neutral position without causing malfunctions due to radial forces urging the control spools to stick.

We claim:
1. In a control valve including a valve spool slidably disposed in a valve bore and having a longitudinal position corresponding to neutral, the combination comprising;
   a relief valve in communication with a conduit for receiving working fluid to the control valve, said valve having a hydrostatic chamber which fills with working fluid that counteracts pressure fluid urging said relief valve to a bypass condition, and
   a vent valve hydraulically disposed between the hydrostatic chamber of said relief valve and a low pressure source, said valve mechanically associated with the valve spool and responsive to the valve spool being in its neutral condition to form a through path for fluid.
2. The control valve of claim 1 further described by the spool having a groove circumscribed around its circumference at a given longitudinal location;
   said vent valve including a spring biased spool which is urged perpendicularly toward the control valve spool;
   a ball disposed between the vent spool and control valve spool, said ball having a diameter which enables the ball to enter the groove in the control valve spool when that spool is in its neutral position;
   said vent valve spool preventing fluid flow through the vent valve when said ball contacts the control valve spool at a longitudinal position not including the groove and forming a through path for fluid when said ball enters the groove.
3. In a control valve including a plurality of valve spools each slidably disposed in a valve bore and each having a longitudinal position corresponding to neutral, the combination comprising;
   a relief valve communicating with a conduit for receiving working fluid to the control valve, said relief valve including a hydrostatic chamber which fills with fluid that counteracts pressure fluid urging said relief valve to a bypass condition, and
   a vent valve mechanically associated with each of the valve spools, said vent valves hydraulically connected in series between the hydrostatic chamber of said relief valve and a low pressure source, said vent valves responsive to their respective spools being in their neutral position to form a through path for fluid.
4. The control valve of claim 3 wherein each of said vent valves includes a spring biased valve spool which is generally perpendicular to its respective control valve spool and urged to a longitudinal position wherein a through fluid path is formed when the respective control valve is in its neutral position.

References Cited in the file of this patent
UNITED STATES PATENTS

| | | |
|---|---|---|
| 2,363,235 | Ellinwood | Nov. 21, 1944 |
| 2,679,263 | Kiser et al. | May 25, 1954 |
| 2,753,730 | Ashton et al. | July 10, 1956 |
| 2,960,111 | Rose | Nov. 15, 1960 |

FOREIGN PATENTS

| | | |
|---|---|---|
| 318,959 | Switzerland | Mar. 15, 1957 |